(No Model.) 2 Sheets—Sheet 1.
M. SÖHNCHEN.
MANUFACTURE OF GLASS BOTTLES.
No. 594,494. Patented Nov. 30, 1897.
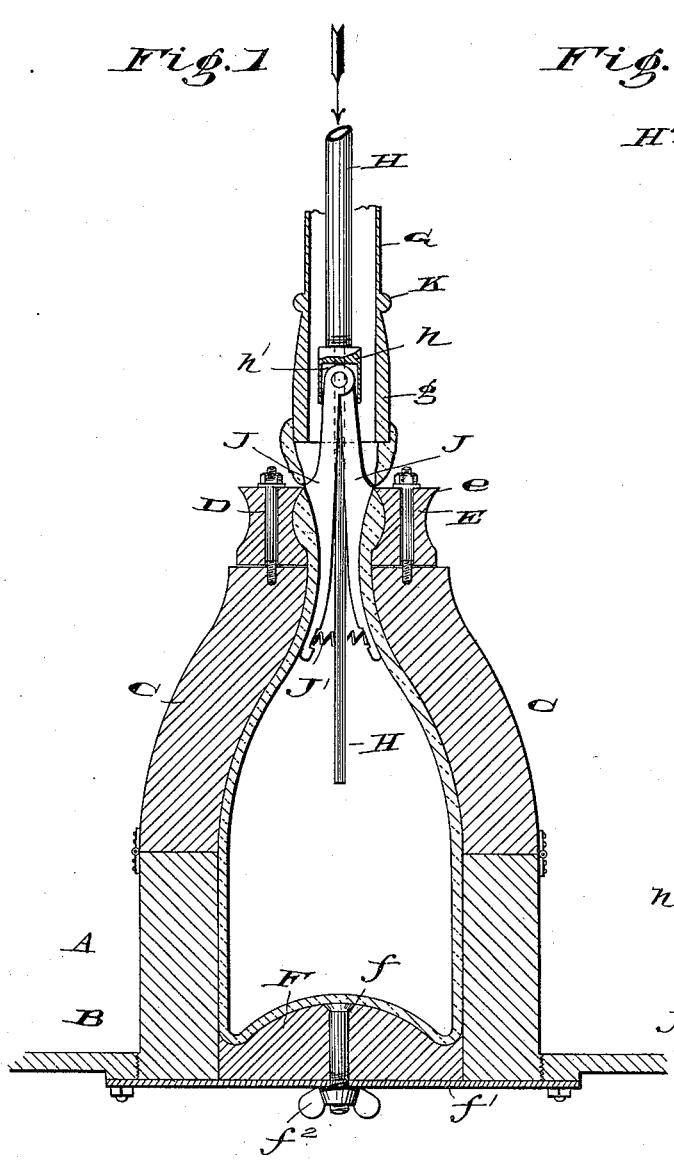
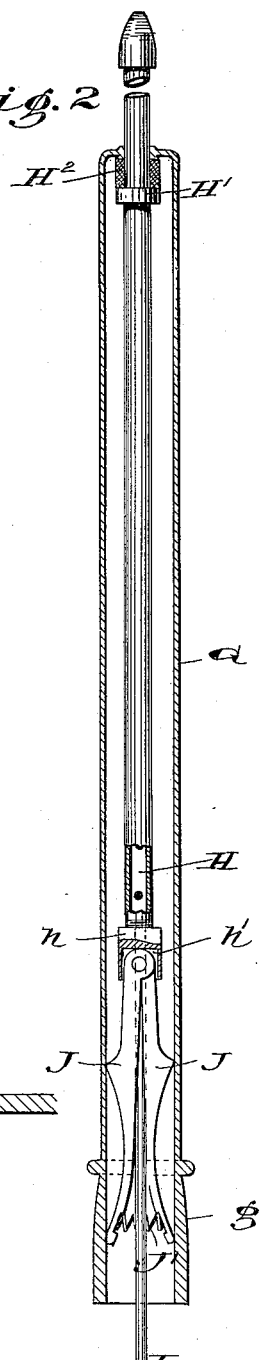
Witnesses:-
Inventor
Moritz Söhnchen

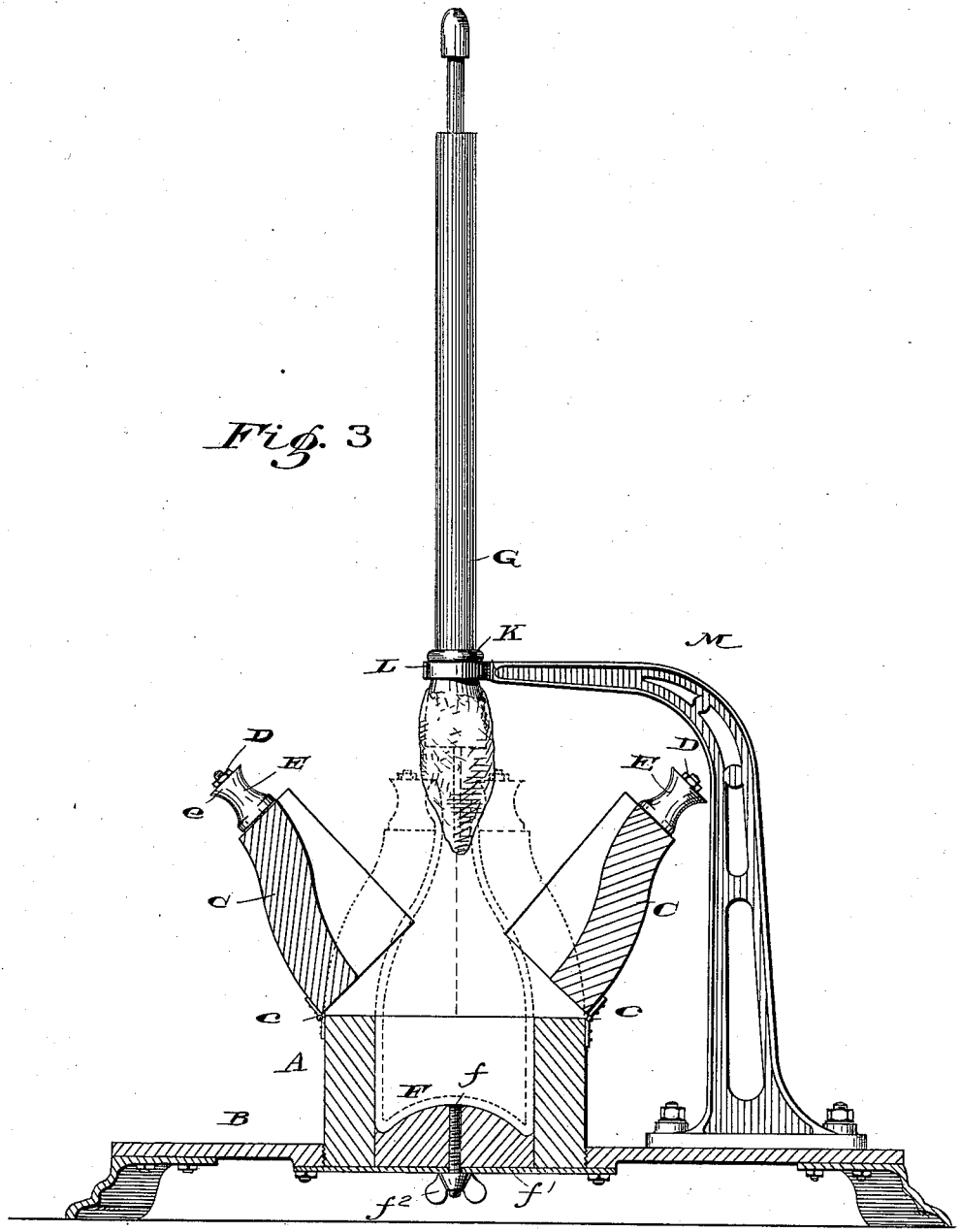

UNITED STATES PATENT OFFICE.

MORITZ SÖHNCHEN, OF MARKTLEUTHEN, GERMANY.

MANUFACTURE OF GLASS BOTTLES.

SPECIFICATION forming part of Letters Patent No. 594,494, dated November 30, 1897.

Application filed June 24, 1897. Serial No. 642,036. (No model.)

*To all whom it may concern:*

Be it known that I, MORITZ SÖHNCHEN, a citizen of the Kingdom of Bavaria, and a resident of Marktleuthen, in the Kingdom of Bavaria and German Empire, have invented certain new and useful Improvements in the Manufacture of Glass Bottles, of which the following is a specification.

This invention relates to an apparatus for molding glass bottles, having particular reference to the mechanism for molding and shaping the neck of the bottle.

It has heretofore been found necessary in molding bottles to mold the body and by a subsequent separate operation form and finish the neck and mouth.

The object of this invention is to provide an apparatus whereby the body and neck may be formed complete in one operation.

The invention therefore consists in a mold comprising a lower annular portion having an interior configuration corresponding to that of the exterior configuration of the body of the bottle to be blown therein, and an upper sectional portion hinged to the lower portion, each hinged section having a roller journaled upon the upper edge thereof, the upper sections, when closed, having an inner configuration corresponding to the exterior configuration of the neck and mouth of the bottle to be formed thereby, in connection with a blowpipe carrying interior molding devices which coact with the mold proper to shape the interior of the neck of the bottle.

The invention further consists in the parts as hereinafter shown, described, and claimed.

In the drawings, Figure 1 is a sectional elevation of a mold and blowpipe, each constructed in accordance with my invention, illustrating the arrangement of the parts while forming a bottle. Fig. 2 is a detail sectional view of a blowpipe; and Fig. 3 is an elevation of the blowpipe and support, the mold being shown in section, the position of the several parts being then assumed prior to blowing a bottle.

A designates the body of the mold, formed of one piece, said body being hollow, the inner walls being parallel and of the size and contour of the body of the bottle to be formed thereby.

B designates the base upon which the mold is secured, which is provided with a screw-threaded orifice into which the body A of the mold screws. The upper section of the mold, or that portion thereof which forms the neck of the bottle, is sectional, each section C being hinged by hinges $c$ to the body, whereby when the sections are closed they, together with the body, have an inner contour corresponding to the exterior contour of the body and neck of the bottle to be formed. Projecting upwardly from each of the sections is a pin D, upon which are revolubly secured rollers E, which have a contour corresponding to the exterior contour of the mouth of the bottle to be formed thereby. The upper edges of these rollers are provided with a sharp edge $e$, for a purpose to be hereinafter described.

F designates the bottom of the mold, secured therein by a bolt $f$ passing therethrough and through a plate $f'$, secured to the base, a nut $f^2$ holding the bottom F to the plate.

G designates the outer casing of a blowpipe, which is somewhat thickened upon the lower end, as at $g$, and arranged and having a sliding movement therein is the blowpipe H, which carries upon its lower end an enlargement $h$, having a recess $h'$, in which is pivotally secured two legs J, normally held apart by a spring J', interposed between the same. Each of the legs J are of a similar contour and when expanded, as shown in Fig. 1, the outer edges correspond to the inner contour of the neck and mouth of the bottle.

The pipe H is limited in its upward movement within the casing G by means of a collar H' thereon, a gasket H² interposed between the collar and the contracted upper end of the casing G removing the jar incident to the pulling up of the pipe H, also serving to form a tight joint at this point.

K designates a collar or annular enlargement upon the casing G, which abuts against and is supported upon the separable ring or U-shaped clamp L, carried by the supporting-standard M, fixed to the base.

In operation the casing G is inserted into the molten glass, the pipe H being previously moved upward into the position shown in Fig. 2, and a portion of glass is gathered upon the casing, which is then suspended upon the standard M, as shown in Fig. 3, the sections C being previously opened. The gathering is now partially blown up and the sections C are closed, when, upon a further blowing and revolving of the mass, the exterior and interior contour of the bottle is formed. Pipe H is now lowered and the legs moving outward under the tension of the spring forces the glass into the groove of the rollers, which revolve coincidently with the glass, and the neck and mouth of the bottle are formed both exteriorly and interiorly. The rollers E, having the sharp upper edges e, impinge the glass between them and the legs forming a groove and leaving only a thin sheet at this point, which can be easily cracked or broken to remove the bottle from the blowpipe. Any well-known means may be employed to open or close the upper sections of the mold simultaneously. This feature not being claimed is not shown or described in detail.

It will thus be seen that, by means of the upper sectional part of the mold and the coaction therewith of the expanding legs and the coaction of the rollers, by the one operation the bottle is practically finished both exteriorly and interiorly.

What I claim is—

1. In an apparatus for molding glass bottles, a mold-body formed in a single piece, sections of mold hinged thereto, and rollers journaled upon the upper edge of each hinged section, substantially as described.

2. In an apparatus for molding glass bottles, a mold-body of a single piece, sections of mold hinged thereto, rollers journaled upon the upper edge of each hinged section, in combination with a blowpipe carrying expanding devices, substantially as described.

3. In an apparatus for molding glass bottles, a base, a mold carried thereby, a standard carried by the base, a blowpipe having a collar thereon for engagement with the standard, and expanding devices carried by the blowpipe, substantially as described.

4. In an apparatus for molding glass, a mold, a blowpipe comprising an outer shell and an inner tube movable longitudinally therein, and legs pivotally secured to the tube normally held apart by an interposed spring, substantially as described.

5. In an apparatus for molding glass bottles, a base having a screw-threaded orifice therein, a mold-body formed of a single piece screwed therein, a plate secured to the base below the orifice, a mold-bottom arranged in the body secured to the plate, sections of mold hinged to the body and grooved rollers journaled upon the upper edge of each hinged section, substantially as described.

In testimony that I claim the foregoing as my invention I have signed my name in presence of two subscribing witnesses.

MORITZ SÖHNCHEN.

Witnesses:
  N. C. FRANK,
  S. STERN.